United States Patent [19]

Gochanour

[11] Patent Number: 5,160,353
[45] Date of Patent: Nov. 3, 1992

[54] GAS SEPARATION MEMBRANE WITH ULTRATHIN LAYER

[75] Inventor: Craig R. Gochanour, Chadds Ford, Pa.

[73] Assignee: E. I. Du Pont de Nemours & Company, Wilmington, Del.

[21] Appl. No.: 575,266

[22] Filed: Aug. 30, 1990

[51] Int. Cl.$^5$ .............................. B01D 53/22
[52] U.S. Cl. ........................... 55/158; 55/16
[58] Field of Search ................... 55/16, 68, 158

[56] References Cited

U.S. PATENT DOCUMENTS

| | | | |
|---|---|---|---|
| 4,230,463 | 10/1980 | Henis et al. | 55/16 |
| 4,279,855 | 7/1981 | Ward, III | 264/298 |
| 4,374,891 | 2/1983 | Ward, III | 428/220 |
| 4,493,714 | 1/1985 | Ueda et al. | 55/16 |
| 4,528,004 | 7/1985 | Makino et al. | 55/158 |
| 4,631,075 | 12/1986 | Yamabe et al. | 55/158 |
| 4,755,299 | 7/1988 | Brüschke | 55/16 X |
| 4,758,251 | 7/1988 | Swedo et al. | 55/158 X |
| 4,767,422 | 8/1988 | Bikson et al. | 55/16 |
| 4,813,983 | 3/1989 | Nohmi et al. | 55/158 |
| 4,851,014 | 7/1989 | Jeanes | 55/158 X |
| 4,871,378 | 10/1989 | Pinnau | 55/16 |
| 4,881,954 | 11/1989 | Bikson et al. | 55/158 X |
| 4,900,626 | 2/1990 | Fabre | 55/16 X |
| 4,925,459 | 5/1990 | Rojey et al. | 55/158 X |
| 4,933,082 | 6/1990 | Yamada et al. | 55/16 X |
| 4,960,519 | 10/1990 | Pasternak et al. | 55/158 X |
| 4,961,855 | 10/1990 | Reale, Jr. et al. | 55/158 X |
| 4,963,165 | 10/1990 | Blume et al. | 55/158 X |

FOREIGN PATENT DOCUMENTS

| | | |
|---|---|---|
| 0152011 | 8/1985 | European Pat. Off. |
| 0337000 | 10/1989 | European Pat. Off. |
| 2541586 | 8/1984 | France |
| 57-132530 | 8/1982 | Japan ................... 55/158 |
| 59-169510 | 9/1984 | Japan ................... 55/158 |
| 61-107921 | 5/1986 | Japan ................... 55/158 |
| 61-107922 | 5/1986 | Japan ................... 55/158 |
| 62-227422 | 10/1987 | Japan ................... 55/158 |
| 01-070105 | 3/1989 | Japan ................... 55/158 |
| WO89/04201 | 5/1989 | PCT Int'l Appl. ........ 55/158 |
| WO9109669 | 7/1991 | PCT Int'l Appl. |
| WO9109670 | 7/1991 | PCT Int'l Appl. |

OTHER PUBLICATIONS

Cabasso et al., "Research and Development of NS-1 and Related Polysulfone Hollow Fiber for Reverse Osmosis Desalination of Seawater", NTIS PB-248666, Jul., 1975, Abstract.

W. J. Koros et al., *J. Appli. Polym. Sci.*, vol. 21, 2899–2904, (1977), "Effect of Pressure on $CO_2$ Transport in Poly(ethylene Terephthalate)".

W. J. Koros et al., *Prog. Polym. Sci.*, vol. 13, 339–401, 1988, "Polymeric Membrane Materials for Solution-Diffusion Based Permeation Separations".

H. G. Elias, "Theta Solvents", pp. VII/205–VII/207, Polymer Handbook, third edition, John Wiley & Sons, 1989, J. Brandrup et al., editors.

O. Fuchs, "Solvents and Non-Solvents for Polymers", pp. VII/379–VII/380, Polymer Handbook, Third Edition, John Wiley & Sons, 1989, J. Brandrup et al., editors.

Henis et al., *Sep. Sci & Technology*, 15(4), pp. 1059–1068, 1980, "A Novel Approach to Gas Separations Using Composite Hollow Fiber Membranes".

K. A. Lundy et al., Ind. Eng. Chem. Res., vol. 28, No. 6, Jun. 1989, pp. 742–756.

*Primary Examiner*—Robert Spitzer

[57] ABSTRACT

This invention is a gas separation membrane containing two polymer layers, a relatively thick layer, and an ultrathin layer, 10 to about 200 Å thick. The ultrathin layer polymer is more selective than the polymer used in the thick layer. Also provided is a process for making such membranes.

46 Claims, No Drawings

GAS SEPARATION MEMBRANE WITH ULTRATHIN LAYER

FIELD OF THE INVENTION

This invention concerns gas separation membranes containing at least two polymer layers, one layer being relatively thick, and one layer being ultrathin, 10 to about 200 Å thick, and wherein the polymer used in the ultrathin layer is inherently more selective than the polymer used in the thick layer. Also provided is a process for making such membranes.

BACKGROUND OF THE INVENTION

Polymeric multilayer membranes are well known in the art. The purposes, construction and properties of the layers in many of these membranes are often different from each other. In many cases one of the layers of such membranes is a conventional membrane, either a microporous membrane or a skinned (or partially skinned) asymmetric membrane.

U.S. Pat. No. 4,230,463 describes a two layer membrane in which the surface of a membrane is coated with an "occluding" layer of a second relatively nonseparating polymer that in essence "seals" one side of the membrane. This construction is used to reduce the contribution of nonselective flow through defects in the skin and results in a membrane whose selectivity is intermediate between that of the polymer making up the skin and that used in the coating. Thus the separation achieved is less than that expected for a defect-free skin, but sufficiently high to be useful.

U.S. Pat. No. 4,813,983 describes a gas separation membrane having a relatively thick but porous polysulfone layer, and a thin, <5 μm, coating of a styrenic polymer. The membranes made in this patent do not have an overall selectivity that is higher than that expected for a defect-free polysulfone layer. The thin layers are formed by evaporation of the solvent of a solution of the styrenic polymer that is on the surface of the polysulfone.

U.S. Pat. No. 4,493,714 describes a gas separation membrane in which a porous polysulfone membrane is coated with a thin layer of a silicon containing polyurea. The silicon containing polyurea is coated onto the polysulfone by an "interfacial" polymerization carried out on the surface of the polysulfone. The thickness of the polyurea layer is about 100 to 10,000 A, but the overall selectivity of the membrane is less than that calculated for the polysulfone layer, assuming that layer was defect-free.

U.S. Pat. No. 4,631,075 describes a gas separating membrane having three layers, a relatively thick, porous, supporting layer, a polyorganosiloxane layer about 300 A to about 5 μm thick, and a thin layer, 100 to 5,000 A thick, of specific composition having a certain separation properties. The present invention does not require three layers and a polyorganosiloxane.

U.S. Pat. No. 4,767,422 describes the "post-treatment" of composite membranes to repair defects in a relatively thin separation layer, by contacting the membranes with a volatile liquid that may optionally contain minute amounts of nonvolatile materials, such as polymers. The patent states that defect pores in the membrane are plugged but no mention is made of forming any additional polymer layers on the membrane.

The present invention provides a gas separation membrane, and a process for making such a membrane, said membrane comprising a relatively thick polymeric layer coated with an ultrathin layer of a polymer of relatively high selectivity, said membrane having a selectivity equal to or greater than that calculated for the thick layer, assuming said thick layer to be defect-free. The advantage of using an ultrathin layer coated on a thick layer is that good selectivity can be attained while maintaining a high flux of the gases to be separated. In order to achieve the requisite selectivity, it is necessary that the ultrathin layer be relatively defect-free, a condition not achieved in membranes of the prior art.

Accordingly, it is an object of the present invention to provide a gas separation membrane of high selectivity.

It is a further object of the present invention to provide a gas separation membrane that allows a high flux of the gas to be separated.

It is an additional object to provide a novel process for making selective gas separation membranes.

SUMMARY OF THE INVENTION

This invention concerns a gas separation membrane comprising a thick polymer layer, optionally supported on a polymeric substrate, and an ultrathin polymer layer, wherein:

said ultrathin layer is about 10 to about 200 Å thick; and provided that:

the selectivity of the polymer of said ultrathin layer is higher than the selectivity of the polymer of said thick layer; and the selectivity of said membrane is equal to or greater than the selectivity calculated for said thick layer, assuming said thick layer to be defect-free.

This invention also concerns a gas separating apparatus comprising said gas separation membrane.

This invention further concerns a process for the production of a gas separation membrane, comprising, contacting the surface of a thick layer of a first polymer, said thick layer optionally supported on a polymeric substrate, with a solution of a second polymer in a solvent, provided that:

said solvent does not dissolve or otherwise substantially affect said thick polymer layer;

said first polymer, second polymer and solvent are chosen so that said second polymer is adsorbed on the surface of said thick first polymer layer; and the final thickness of the ultrathin second polymer layer formed after solvent removal is about 10 to about 200 Å.

DETAILS OF THE INVENTION

Two of the critical factors that determine the practicality of membrane based gas separation processes are the flux and selectivity of the membrane. Flux is the amount of gas, normalized for pressure and surface area, that flows through the membrane under a given set of conditions. Generally speaking, the thinner the membrane, the higher the flux. Membrane selectivity determines the ability of a membrane to separate two (or more) different gases, and is herein defined as the ratio of the fluxes of the two (or more) gases flowing through the membrane. Thus, ideally, the membrane should be a very thin defect-free layer of a polymer of high selectivity.

Other practical factors, however, come into play. An unsupported thin film does not have the requisite strength for fabrication and handling of the membrane, so it is usually necessary to support the membrane in some way. One common way is to use asymmetric membrane technology. Asymmetric membranes are structures which consist of a thin, relatively dense layer supported by a much thicker porous substructure composed of the same polymer. The skin layer of such membrane is generally 250 Å or more thick, and often contains defects which lead to nonselective gas flow, and hence membrane selectivities which are less than that expected from dense film results. This type of membrane, which is suitable for use herein as the thick layer and supporting substrate, is described in Cabasso, et al., Research and Development of NS-1 and Related Polysulfone Hollow Fibers for Reverse Osmosis Desalination of Seawater, NTIS PB-248666, pub. July, 1975, which is hereby included by reference.

Another type of membrane that may be used as the thick layer herein is a thick film composite membrane, which consists of a dense film, generally more than 500 Å thick, supported by a microporous substrate. This microporous substrate is generally composed of a second polymer and only provides mechanical support. The separating characteristics of this type of membrane are determined by the properties of the dense film. This type of membrane is described in U.S. Pat. No. 3,616,607, which is hereby included by reference. These two types of membranes, either of which may be used herein as the thick layer and supporting substrate, may be used in any shape useful for gas separation, for example sheets or hollow fibers. The ultrathin layer formed on each of these types of structures may be on either the "outside" or "inside" of the membrane surface, for example a hollow fiber, but is usually on the outside. These elements may then be formed into a gas separation module by bundling many fibers together, or by forming a flat film into a spiral wound module. The fabrication of such modules is known in the art.

In order to obtain relatively defect-free ultrathin layers on the thick layer, it is preferred that the surface of the thick layer to be coated be relatively defect free, that is, have limited porosity. Defects lead to nonselective gas flow and may consist of surface "flaws" such as holes, pores, channels, etc. The precise characterization of the number, size and type of defects in a gas separation membrane is extremely difficult. The selectivity of the membrane is, however, indicative of the continuity of the membrane surface. Thick layers whose surfaces have relatively small and infrequent defects, which are preferred for use in this invention, will have selectivities substantially greater than 1 and at least 50% of that expected for a defect-free thick layer. Such thick layers are defined herein as having limited porosity. It is also preferred that the thick layer flux is high, i.e., a thin surface layer on an asymmetric membrane or composite membrane. Polymers useful for the thick layer include, but are not limited to, polyimides, polyamides, polyesters, cellulosics, polysulfones, vinyl polymers, polymethacrylates, and polyacrylates.

The ultrathin layer of the membrane consists essentially of a polymer whose selectivity in dense film form is higher than that of the polymer of the thick layer. By a dense film form or "defect-free" herein is meant a polymer film with no defects, i.e., holes, fissures, pores, etc. Polymer selectivity is defined as the ratio of the dense film permeabilities of the gases to be separated. The measurement of permeability is well known to those skilled in the art, for example, see W. J. Koros, et al., J. Appl. Polym. Sci., vol. 21, p. 2899-2904 (1977), which is hereby included by reference. The selectivities of many polymers are listed in the literature, for example, see Koros, W. J., et al., Progress in Polym. Sci., vol. 13, p. 339-401 (1988), which is hereby included by reference, for a list of such values.

The thickness of the ultrathin layer of the membrane is about 10 to about 200 Å, preferably about 15 to 100 Å, more preferably about 15 to about 90 Å, and most preferably about 25 to about 75 Å. The effective thickness of the ultrathin layer can be calculated from the flux of the membrane before and after coating, and dense film permeation data for the polymer comprising the ultrathin layer. Measurements of the thickness of the ultrathin layer herein are also made by X-ray Photoelectron Spectroscopy. Despite the extreme thinness of the ultrathin layer, it is believed, based on the high selectivity of the membrane, to be very uniform with few defects. If substantial defects were present in the ultrathin layer, such high selectivities would not be obtained.

The actual (measured) selectivity of the gas separation membrane must be equal to or greater than the calculated selectivity of the thick layer, assuming the thick layer to be defect-free. The selectivity of the thick layer may be calculated from the permeabilities of the gases to be separated, which in turn may be obtained by experiment or from literature values (supra).

The gas separation membrane of the present invention is made by a process wherein at least one surface of the thick (first) polymer layer is contacted with a solution of a second polymer which will form the ultrathin polymer layer. The first and second polymers and solvent are chosen so that the second polymer will be adsorbed from solution onto the surface of the first polymer. The first and second polymers must also be chosen so that the selectivity of the second polymer is higher than the selectivity of the first polymer (supra), and the first polymer and solvent must be chosen so that the solvent does not dissolve or otherwise substantially affect (for example swell) the first polymer.

Adsorption of polymers from solution onto a polymer surface (of a different polymer) is known to those skilled in the art, see for example, deGennes, P. G., Macromolecules, vol. 14, p. 1637-1644 (1981). Measurements of the amount of polymer adsorbed from solution onto another polymer surface can be made by measuring the adsorption isotherm. This too is known to those skilled in the art, see for example, Rowland, F. R., and Eirich, F. R., J. Polym. Sci., Part A, vol. 4, p. 2401-2421 (1966). The measurement of such an adsorption isotherm is predictive of whether a gas separation membrane can be made by the present process, and may be used to determine whether the three components used in the process (first and second polymers and solvent) truly give a process in which adsorption occurs, or a system in which the first polymer is coated merely by coating the first polymer with the solution of the second polymer, and evaporating the solvent (which is analogous to "painting" the first polymer surface).

There are some general criteria and techniques the practitioner can use to narrow the choice of the first and second polymers and solvent. The choice of the first and second polymers is narrowed by the relative selectivities of the two, which can often be obtained from literature sources, or by experimentation. The choice of solvent versus the first polymer can also be narrowed, since the first polymer should be relatively unaffected by the solvent. Tables of solubilities of various polymers in various solvents are available in the literature, for example, see O. Fuchs in J. Brandrup and E. H. Immergut, Ed., Polymer Handbook, 3rd Ed., John Wiley & Sons, New York, 1989, p. VII379-VII407 (nonsolvents are also listed here), which is hereby included by reference. It may sometimes be more convenient to actually test the effect of a certain solvent on a particular first polymer in thick layer form.

Another important consideration is whether the second polymer will be adsorbed from solution onto the surface of the first polymer. Although no absolute rules can be given, there are some helpful general guidelines premised on the concept that adsorption will occur if the first polymer surface is more "attractive" to second polymer molecules than to the solvent. Thus, the probability of adsorption increases if the first and second polymers: (i) are chemically similar; (ii) can hydrogen bond to each other; and/or (iii) have other attractive forces between them (for example, electrostatic). Another factor is that attraction of the solvent for the polymer should be minimized. For example, solvents which just barely dissolve the polymer, so-called theta solvents (see H. G. Elias in J. Brandrup and E. H. Immergut, Ed., Polymer Handbook, 3rd Ed., John Wiley & Sons, New York, 1989, p. VII205-VII231, which is hereby included by reference, for an explanation and listing of theta solvents) may be particularly useful.

The choice of theta solvents for any particular polymer is usually limited. A more practical and generally applicable approach is to use a solvent mixture as a solvent for the second polymer. The mixture consists of two or more compounds, at least one of which is a solvent for the second polymer and at least one of which is a nonsolvent for the second polymer. All of these compounds [solvent(s) and nonsolvent(s)] must be miscible with one another. Thus one skilled in the art will realize that one dissolves the second polymer in a solvent-nonsolvent mixture (which herein is included within the meaning of a solvent for the second polymer) and tests whether the second polymer is adsorbed on the first polymer. The test may actually be a test of the selectivity of a gas separation membrane. If adsorption has not occurred, one can repeat the experiment with a slightly higher proportion of nonsolvent to solvent. Such short and simple experiments may be used to obtain the proper combination of first and second polymers and solvent for the second polymer. Thus it is preferred in the present process to use a combination of one or more solvents and one or more nonsolvents as the "overall solvent" (or simply solvent) for the second polymer. The use of such solvent-nonsolvent combinations is illustrated in the Examples.

The type of polymer used to form the ultrathin layer may be limited by the solvents which can be used without damaging the thick layer. This problem can be circumvented by forming the ultrathin layer from a block copolymer in which one component is chosen for its solubility in solvent systems which do not damage the thick layer, and the second component is chosen for its high selectivity. For most polymer pairs the two components will be immiscible and a phase separated, three layer structure will be formed. In this case the thick layer will be coated with an ultrathin layer consisting of separate layers of each of the two components of the block copolymer. The use of such a block copolymer is illustrated in the Examples.

The thickness of the ultrathin (second) polymer layer is affected by the relative attraction of the solvent and thick (first) polymer surface (supra) for the second polymer. It is also slightly affected by the concentration of the second polymer in solution. While no upper or lower limits of second polymer concentration are implied, concentrations of $10^{-5}$ g/ml to about $10^{-1}$ g/ml, especially about $10^{-4}$ g/ml to about $10^{-2}$ g/ml of second polymer are preferred.

After adsorption of the ultrathin (second) polymer layer, the gas separation membrane is removed from the solution of the second polymer and dried to remove solvent. Solvent may be removed by, for example, simple evaporation in air (or a gas stream) at ambient or higher temperatures. The membrane may also be dried during use (of course some of the effluent gas will contain solvent vapors). Or, prior to drying, the membrane may be rinsed with a small amount of pure second polymer solvent (mixture) to displace second polymer solution remaining in contact with the membrane. Since the second polymer is more strongly attracted to the first polymer than to the solvent, use of a small amount of solvent to wash off excess second polymer solution will not disturb the adsorbed second polymer layer. In prior art processes which simply "paint" the surface of the thick polymer with a solution of thin layer polymer, such washing usually removes some or all of the thin polymer layer.

Examples of combinations of first polymers, second polymers and solvents include, but are not limited to, the following:

| First Polymer | Second Polymer | Solvent |
| --- | --- | --- |
| Polyimide | Hydroxypropyl cellulose | Water |
| Polyimide | Vinyl acetate/alcohol copolymer | Methanol/water |
| Polyimide | PMMA/PnBMA (block) | Acetone/isopropanol |

The process may be run at any convenient temperature. It will be recognized by one skilled in the art that the relative attraction of the second polymer to the solvent and first polymer may change somewhat with temperature, so that temperature may affect the solubility and/or amount of deposition of the second polymer. In most cases it is convenient to run the process at ambient temperature, but other temperatures may be used. For example, elevated temperatures may be needed to dissolve a particular second polymer in a particular solvent. The contact time of the first polymer and second polymer solution is usually not critical, typically ranging from a few minutes to a few hours.

Preferred thicknesses, and other features of the gas separation membranes produced by this process are as described above.

The gas separation membranes described herein are useful for separating gases, the particular separation depending upon the polymers chosen for the thick and thin layers. Such separations may include, but are not limited to, the following gas pairs, oxygen and nitrogen, carbon dioxide and nitrogen, helium and hydrogen, carbon dioxide and methane or higher hydrocarbons, and hydrogen and methane or other higher hydrocarbons.

X-ray Photoelectron Spectroscopy (XPS) is a surface sensitive technique in which the surface composition of a material can be determined, and is used in the following Examples to determine coating thickness. The presence of a coating is detected by the appearance of photoelectrons at energies which are characteristic of the functional groups in the coating polymer which are not present in the substrate, or are present in different proportions. The thickness of the coating can be determined by an analysis of the attenuation of the photoelectron signal from atoms which are present only in the substrate. Nitrogen and fluorine signals were used for the polyimide thick layer herein. As the coating thickness increases, the signal from these substrate atoms is attenuated, with an exponential decrease in signal intensity with increased thickness. The degree to which different coatings attenuate a photoelectron signal from the thick layer is determined by chemical composition of the coating material.

The thickness of a coating layer can also be determined from the gas permeability of the composite structure. This is most easily done using the "Resistance Model" which is described in Henis, J. M. S. and Tripodi, M. K., Sep. Sci. Technology, Vol. 15, p. 1059 (1980); U.S. Pat. No. 4,230,463. The resistance of the composite structure, i.e., thick layer and ultrathin layer, is determined by the resistance of the layers combined in series. The resistance of the thick layer is determined from the experimentally determined gas flows through the thick layer prior to coating. The resistance of the ultrathin layer is calculated from the known dense film permeability of its component polymer. The thickness of the ultrathin layer is adjusted to match the measured flux of the higher flux gas to be separated (i.e., oxygen for oxygen/nitrogen separations). This thickness can then be used to calculate the selectivity expected for the composite. A similar model can be used for three layer systems prepared using block copolymers. In this case the effective resistance is the series combination of the resistances of each of the three layers.

TESTING PROCEDURES

Tubeside Feed Test

Fibers (144) are potted in epoxy resin (both ends, fiber extended) in a module with the permeate exiting from the surrounding shell at the feed end to obtain countercurrent flow. The active length of the fibers is 40.6 cm. The product flow rate is controlled so that 95% nitrogen is produced from air feed which is supplied to the bore of the fibers at 100 psig. The composition of the feed, product, and permeate streams are measured using a calibrated oxygen analyzer. Product and permeate flow rates are measured using a soap film bubble meter. Measurements were made at room temperature. The oxygen flux and selectivity are calculated from the measured recovery and product flow rate. The flux is given in GPUs, 1 GPU=$10^{-6}$ STPcc/(sec-cm$^2$/cm Hg).

Shellside Feed Test

Fibers (24) in the form of a loop are potted in epoxy in a module with an inlet and exit for the feed gas (air at 100 psig, 2 L/min flow rate). The active length of the fiber is 40 cm. The composition of the feed is determined with a calibrated oxygen analyzer. In this test the permeate passes through the fiber wall into the bore. The permeate flow rate is measured using a soap film bubble meter and the composition is determined with a gas chromatograph. Measurements were made at room temperature. The oxygen flux and oxygen/nitrogen selectivity are calculated from the feed gas composition, pressure and flow rate, and the flow rate and composition of the permeate.

Thick Layer Polymer Preparation

To a stirred solution of 2,4,6-trimethyl-1,3-phenylene diamine (150.24 g, 1.00 mol) in dimethylsulfoxide (2 L) was added 4,4'-[2,2,2-trifluoro-1-(trifluoromethyl)ethylidene]-bis(1,2-benzenedicarboxylic acid anhydride) (6FDA, 224.22 g, 0.505 mol) and 3,3',4,4'-biphenyltetracarboxylic acid dianhydride (148.58 g, 0.505 mol) under a nitrogen atmosphere at room temperature. The resulting very viscous, orange reaction solution was allowed to stir overnight at room temperature. With rapid stirring, a solution of acetic anhydride (408.4 g, 4.0 mol) and triethylamine (404.8 g, 4.0 mol) was added and the resulting viscous reaction solution allowed to stir at room temperature for 4 hours. The polymer solution was precipitated in water. The resulting white solid was collected by filtration and washed twice with water and methanol. After drying overnight by suction, the polymer was further dried in a vacuum oven (20 inches (51 cm) mercury) at 120° C. for 3 hours and at 250° C. for 5 hours.

Thick Layer Preparation

This describes the material and processes by which asymmetric hollow fiber aromatic polyimide membranes were produced. These are the thick layers in the Examples. The hollow fiber membranes are spun from a hollow fiber spinnerette into a water coagulant as has been taught in the prior art.

Fiber A

A polymer solution was prepared containing approximately 21% (weight) solids, said solids consisting of the aromatic polyimide described above, 20% (weight, based on polymer) lithium nitrate, 20% (weight, based on polymer) tetramethylene sulfone, 3% (weight, based on polymer) 4,4'-[2,2,2-trifluoro-1-(trifluoromethyl)-ethylidene bis(1,2-benzenedicarboxylic acid anhydride] in a 1:1 (weight) mixture of N,N-dimethylacetamide and dimethylsulfoxide. Similar polymers are described in U.S. Pat. No. 4,705,540 and U.S. Pat. No. 4,717,394. The above polymer solution was extruded through a hollow fiber spinnerette with fiber channel dimensions of outer diameter (OD) equal to 22 mils (5.6×$10^{-4}$ m) and inner diameter (ID) equal to 10 mils (2.54×$10^{-4}$ m) at the rate of 213 mL per hour at 115° C. A solution of 15% (weight) lithium nitrate in a 47.5:47.5:5.0% (weight) solution of N,N-dimethylacetamide:dimethylsulfoxide:water was injected into the fiber bore at a rate of 85.7 mL per hour. The spun fiber passed through an air gap length of 1 cm at 20° C. into a water coagulant bath maintained at 20° C. The fiber was wound up on a drum at the rate of 75 meters per minute.

The water-wet fiber was dehydrated as taught in U.S. Pat. Nos. 4,080,743; 4,080,744; 4,120,098; and EPO 219,878. This specifically involved the sequential replacement of water with methanol, the replacement of methanol with hexane, and drying.

Fiber B

Fiber B was prepared using a procedure similar to that used to prepare Fiber A. Fibers were spun from a dope containing 22% (weight) solids consisting of: the polyimide described above, 20% (weight, based on polymer) tetramethylene sulfone, 10% (weight, based on polymer) lithium nitrate and 6% (weight, based on polymer) acetic anhydride in a 50% (weight) mixture of dimethyl sulfoxide and dimethyl acetamide. The bore solution was composed of 42.5/42.5/15 (vol %) DMAC/DMSO/H$_2$O. The bore solution flow rate was 77.3 mL/hr. An air gap of 7.5 cm was used with a quench bath temperature of 50° C.

Fiber C

Fiber C was prepared using a dope identical to that used for Fiber B. The spinning conditions were the same as for Fiber B except that an air gap of 4 cm was used. The bore solution flow rate was 130 mL/min.

Fiber D

Fiber D was prepared using a procedure similar to that used to prepare Fiber A. The polymer which makes up the fiber is a blend of the polyimide described above and Thermoguard T-230 (available from M&T Chemicals, Inc.) containing 20% by weight Thermoguard. Fibers were spun from a dope identical to that used for Fiber B except that 20% (weight, based on polymer) Thermoguard T-230 was added. The bore solution used was composed of 42.5/42.5/15 (vol %) DMAC/DMSO/H$_2$O. The bore solution flow rate was 77.3 mL/h. All other spinning conditions were the same as those used for Fiber A.

Fiber Properties

The substrates are asymmetric hollow fiber formed using conventional technology as described above. The polyimide which makes up the fibers A, B and C has an oxygen permeability of 5100 cB and selectivity oxygen/nitrogen of 4.1. The selectivity of fibers A, B and C before coating ranged from 3.3 to 3.65. This is from 74% to 85% of the defect-free selectivity.

The polymer blend which makes up Fiber D has an oxygen permeability of 1100 cB and selectivity oxygen/nitrogen of 4.25. The fiber has limited porosity, selectivity before coating ranged from 3.6 to 4.2. This is 80% to 98% defect-free.

EXAMPLES 1-4

Tubeside test modules were prepared and tested. The separation characteristics before treatment are shown in Table 1. The module was then filled with a dilute solution of hydroxypropyl cellulose in water (10$^{-3}$ g/ml). The oxygen (O$_2$) permeability of hydroxypropyl cellulose is reported to be 30 cB with oxygen/nitrogen (O$_2$/N$_2$) selectivity =8.3 [Klucel Physical and Chemical Properties, Aqualon Corp., 1987]. The solution was then drained from the module. The fiber was dried at room temperature with any residual water removed during the initial portion of the testing process. The properties after treatment are shown in Table 1.

TABLE 1

| Ex. # | Fiber Type | Before Treatment O$_2$ Flux/Selectivity | After Treatment O$_2$ Flux/Selectivity |
|---|---|---|---|
| 1 | A | 156 GPU/3.65 | 71 GPU/4.35 |
| 2 | A | 198 GPU/3.55 | 75 GPU/4.25 |
| 3 | B | 251 GPU/3.3 | 94 GPU/4.3 |
| 4 | B | 195 GPU/3.8 | 93 GPU/4.45 |

These results demonstrate the beneficial effect of this treatment. The as-spun fiber has a selectivity below that expected for defect-free fibers. The selectivity after treatment is significantly higher and is equal to that expected for the defect-free fiber. For both types of fiber, the results are extremely reproducible. Example 1 was heated to 100° C. for 153 hrs and then retested. There was no change in properties indicating that the treatment results in the formation of a stable structure.

EXAMPLES 5-8

The contact time and polymer concentration were varied. The other conditions are identical to those used in Examples 1-4. The separation characteristics before and after treatment are given in Table 2. Fiber D was used as the substrate.

TABLE 2

| Ex. # | Conditions | Before Treatment O$_2$ Flux/Selectivity | After Treatment O$_2$ Flux/Selectivity |
|---|---|---|---|
| 5 | 10$^{-3}$ g/ml 1 hr contact | 74 GPU/4.0 | 42 GPU/4.7 |
| 6 | 10$^{-4}$ g/ml 1.5 hr contact | 83 GPU/3.9 | 49 GPU/4.3 |
| 7 | 10$^{-4}$ g/ml 24 hr contact | 73 GPU/4.2 | 46 GPU/4.6 |
| 8 | Water alone | 75 GPU/3.6 | 61 GPU/3.7 |

These results indicate that the polymer concentration and contact time are not particularly important. Example 8 demonstrates that the solvent alone is not responsible for the observed effect.

EXAMPLES 9-13

The same procedure as in Examples 1-4 was used, but the molecular weight was varied. Substrate B was used with a constant polymer concentration of 10$^{-}$g/ml and a constant contact time of 1 hr. The results for nominal molecular weights ranging from 80,000 to 1,000,000 are given in Table 3. There is a decrease in flux with increasing molecular weight as would be expected for increased adsorption. The moderate increase in selectivity indicates that an extremely thin coating is always formed, calculated to be less than about 10 angstroms.

TABLE 3

| Ex. # | Molecular Weight | Before Treatment O$_2$ Flux/Selectivity | After Treatment O$_2$ Flux/Selectivity |
|---|---|---|---|
| 9 | 95,000 | 272 GPU/3.4 | 109 GPU/4.3 |
| 10 | 100,000 | 203 GPU/3.5 | 62 GPU/4.6 |
| 11 | 100,000 | 195 GPU/3.5 | 70 GPU/4.4 |
| 12 | 300,000 | 149 GPU/3.9 | 57 GPU/4.7 |
| 13 | 1,000,000 | 181 GPU/3.9 | 54 GPU/4.7 |

EXAMPLES 14-22

The coating was formed using a copolymer of vinyl acetate and vinyl alcohol containing 60 mol % acetate, obtained from Polysciences (Catalog #17561). Substrate A fibers were treated using the procedure of Example 1. The copolymer, which is soluble in methanol but insoluble in water, was dissolved in methanol/water mixtures containing less than 55% water. Larger proportions of water result in incomplete solution of the copolymer at the polymer concentrations employed. The O$_2$ permeability of this copolymer was determined to be 10.7 cB with selectivity of 7.77. The results of a series of examples where polymer concentration and solvent/nonsolvent ratio were varied are given in Table 4. The fiber used in Example 18 was the same fiber as Example 22 (the control) and was used after the experiments in Example 22 were completed. The coating procedure was repeated twice on Example 21; the selectivity did not change after the second coating while the flux dropped somewhat. The flux drop is probably due to a second solvent exposure, the constant value of selectivity found indicates that an equilibrium structure is formed.

TABLE 4

| Ex. # | Polymer Conc. (g/ml) | Sol. Comp. (Vol. % MeOH) | Before Treatment $O_2$ Flux/Sel | After Treatment $O_2$ Flux/Sel | Substrate |
|---|---|---|---|---|---|
| 14 | $2.5 \times 10^{-4}$ | 50 | 158 GPU/3.63 | 16.1 GPU/7.07 | A |
| 15 | $2.5 \times 10^{-4}$ | 50 | 164 GPU/3.66 | 9.7 GPU/6.65 | A |
| 16 | $1.0 \times 10^{-3}$ | 50 | 183 GPU/3.63 | 10.4 GPU/6.86 | B |
| 17 | $1.0 \times 10^{-3}$ | 55 | 137 GPU/3.36 | 9.0 GPU/6.52 | A |
| 18 | $1.0 \times 10^{-3}$ | 50 | 101 GPU/3.21 | 8.2 GPU/7.31 | A |
| 19 | $2.6 \times 10^{-3}$ | 60 | 147 GPU/3.75 | 29.7 GPU/5.55 | A |
| 20 | $1.0 \times 10^{-3}$ | 60 | 164 GPU/3.56 | 22.3 GPU/5.72 | A |
| 21A | $1.0 \times 10^{-3}$ | 60 | 420 GPU/3.8 | 42.1 GPU/5.34 | D |
| 21B | $1.0 \times 10^{-3}$ | 60 | 420 GPU/3.8 | 34.0 GPU/5.35 | D |
| 22 | 0.00 | 50 | 140 GPU/3.21 | 101 GPU/3.55 | A |

These results can be explained in terms of the adsorption mechanism. As the solvent quality becomes poorer with the addition of water, the relative affinity of the substrate membrane surface for the coating polymer increases. This leads to a increase in the mass of polymer adsorbed and an increase in the layer thickness of the vinyl acetate/vinyl alcohol layer. Example 22 clearly demonstrates that the solvent alone is not responsible for this effect. The effective thickness of the ultrathin layer can be calculated using a series resistance model. For Example 14, the layer thickness is calculated to be 56 angstroms.

EXAMPLE 23

A copolymer of vinyl acetate and vinyl alcohol was prepared by the hydrolysis of polyvinyl acetate (Polysciences #2025). The acetate content was found to be 82% by UV spectroscopy. This copolymer was used to treat a sample of substrate fiber A using 40 vol % methanol in water. The $O_2$ flux before treatment was 109 GPU with selectivity of 3.8. The fiber was treated under conditions identical to Example 20. The $O_2$ flux after treatment was 12 GPU with selectivity 7.4. This fiber was then removed from the module and examined using X-ray Photoelectron Spectroscopy (XPS). The XPS data were compared to that of an untreated fiber and indicated that the fiber was coated with a coating thickness of approximately 30 angstroms. The chemical composition of the coating inferred is consistent with a coating of vinyl acetate/vinyl alcohol copolymer.

EXAMPLES 24–29

A block copolymer of methyl methacrylate (MMA) and n-butyl methacrylate (nBMA) was used as the coating polymer. The MMA and nBMA blocks are approximately equal in length (50/50). Substrate fiber A in shellside test modules was used in these experiments. A contact time of 30 min. was used. This block copolymer is prepared by group transfer polymerization (GTP). Solutions of this block copolymer in acetone/isopropanol were prepared by dilution of a stock solution containing 0.15 g polymer/100 mL isopropanol. Acetone is a solvent for both PMMA and PnBMA while isopropanol is a solvent only for PnBMA. This copolymer forms true solutions in solvent mixtures containing more than 16% acetone. Final properties, given in Table 5, were obtained after drying at room temperature and 50° C. in a vacuum oven. After testing the fiber was removed from these modules and the fibers were examined using XPS. The results from these experiments confirmed that the fibers were indeed coated with the atomic composition of the coating consistent with that expected for the block copolymer. The estimates of the coating thickness obtained are given in Table 5. XPS does not distinguish between MMA and nBMA layers; thus the given thickness is the sum of the thickness of both layers. The coating thickness increases as the amount of nonsolvent for PMMA increases as expected for the adsorption mechanism.

TABLE 5

| Ex. # | Solv. Comp. (Vol. % acetone) | Before Treatment $O_2$ Flux/ Selectivity | After Treatment $O_2$ Flux/ Selectivity | XPS Thickness (Å) |
|---|---|---|---|---|
| 24 | 35 | 156 GPU/3.3 | 23 GPU/4.5 | 5 |
| 25 | 30 | 131 GPU/3.5 | 23 GPU/4.7 | 9 |
| 26 | 25 | 150 GPU/3.3 | 21 GPU/4.9 | 14 |
| 27 | 20 | 164 GPU/3.3 | 16 GPU/6.0 | 29 |
| 28 | 18 | 155 GPU/3.2 | 10 GPU/6.5 | 38 |
| 29 | 16 | 166 GPU/3.2 | 10 GPU/6.8 | 45 |

EXAMPLE 30

A shellside test module was treated like Examples 24–29. A solution of 80/20 isopropanol/acetone containing no polymer was used. The properties before treatment were 153 GPU/Sel=3.3. After treatment we found 54 GPU/Sel=3.8. The solvent mixture alone is not responsible for the effects seen in Examples 24–29. There is however a loss in flux due to solvent exposure. This flux loss will become more severe with increasing acetone concentration; exposure to pure acetone results in an essentially complete loss in flux. This is one reason why the block copolymer is used. PMMA will not dissolve in mixtures containing less than about 40% acetone. By using the block copolymer we are able to work in less damaging solvent conditions.

The expected properties of the composite membranes prepared from the block copolymer can be calculated if we account for the flux loss due to solvent damage. The literature values for the permeability of PMMA are roughly 8cB and Sel=~8 (Chin, J. S. and Paul, D. R., J. Appl. Poly. Sci., 33, 2935 (1987)). A composite formed from a 50 GPU/Sel=4.5 substrate and a PMMA coating would be expected to show 22 GPU/Sel=6.4 for a 20 Å coating and 14 GPU/Sel=7.0 for a 40 Å coating (the permeability of PnBMA is too high to contribute). Thus the composites reported in Examples 28 and 29 above are consistent with a defect-free coating with a thickness of less than 50 Å.

Although preferred embodiments of the invention have been described hereinabove, it is to be understood that there is no intention to limit the invention to the precise constructions herein disclosed, and it is to be further understood that the right is reserved to all changes coming within the scope of the invention as defined by the appended claims.

What is claimed is:

1. A gas separation membrane comprising a thick polymer layer, and an ultrathin polymer layer, wherein:
   said ultrathin layer is 10 to about 90 A thick; and provided that:
   the selectivity of the polymer of said ultrathin layer is higher than the selectivity of the polymer of said thick layer; and
   the selectivity of said membrane is greater or equal to the selectivity calculated for said thick layer, assuming said thick layer is defect-free.

2. A gas separation membrane as recited in claim 1 wherein said thick layer is at least about 250 A thick.

3. A gas separation membrane as recited in claim 1 wherein said ultrathin layer is about 15 to about 90 A thick.

4. A gas separation membrane as recited in claim 1 wherein said ultrathin layer is about 25 to about 75 A thick.

5. A gas separation membrane as recited in claim 1 in the form of a sheet.

6. A gas separation membrane as recited in claim 1 in the form of a hollow fiber.

7. A gas separation membrane as recited in claim 6 wherein said ultrathin layer is on the outside of said hollow fiber.

8. A gas separation membrane as recited in claim 7 wherein said ultrathin layer is about 15 to about 90 A thick.

9. A gas separation membrane as recited in claim 7 wherein said ultrathin layer is about 25 to 75 A thick.

10. A gas separation membrane as recited in claim 7 wherein said thick layer has a selectivity of at least half that calculated for a defect-free thick layer.

11. An apparatus comprising several gas membranes as described in claim 10 bundled together to form a module.

12. An apparatus comprising several gas membranes as described in claim 7 bundled together to form a module.

13. A gas separation membrane as recited in claim 1 wherein said thick layer has a selectivity of at least half that calculated for a defect-free thick layer.

14. An apparatus comprising several gas membranes as described in claim 1 bundled together to form a module.

15. The gas separation membrane of claim 1 wherein the thick polymer layer is supported on a polymeric substrate.

16. An apparatus comprising a thick polymer layer, and an ultrathin polymer layer, wherein:
    said ultrathin layer is 10 to about 90 A thick; and provided that:
    the selectivity of the polymer of said ultrathin layer is higher than the selectivity of the polymer of said thick layer; and
    the selectivity of said membrane is greater or equal to the selectivity calculated for said thick layer, assuming said thick layer is defect-free.

17. An apparatus as recited in claim 16 wherein said thick layer is at least about 250 A thick.

18. An apparatus as recited in claim 16 wherein said ultrathin layer is about 15 to about 90 A thick.

19. An apparatus as recited in claim 16 wherein said ultrathin layer is about 25 to about 75 A thick.

20. An apparatus as recited in claim 16 in the form of a sheet.

21. An apparatus as recited in claim 16 in the form of a hollow fiber.

22. An apparatus as recited in claim 21 wherein said ultrathin layer is on the outside of said hollow fiber.

23. An apparatus as recited in claim 22 wherein said ultrathin layer is about 15 to about 90 A thick.

24. An apparatus as recited in claim 22 wherein said thin layer is about 25 to 75 A thick.

25. A gas separation membrane as recited in claim 22 wherein said thick layer has a selectivity of at least half that calculated for a defect-free thick layer.

26. A gas separation membrane as recited in claim 16 wherein said thick layer has a selectivity of at least half that calculated for a defect-free thick layer.

27. The apparatus of claim 16 wherein the thick polymer layer is supported on a polymeric substrate.

28. A process for the production of a gas separation membrane, comprising, contacting the surface of a thick layer of a first polymer with a solution of a second polymer in a solvent, provided that:
    said solvent does not dissolve or otherwise substantially affect said thick first polymer layer;
    said first polymer, second polymer and solvent are chosen so that said second polymer is adsorbed on the surface of said thick first polymer layer; and
    the final thickness of an ultrathin second polymer layer formed after solvent removal is about 10 to about 200 A.

29. The process as recited in claim 16 wherein said thick first layer is supported on a polymeric substrate.

30. The process as recited in claim 16 wherein said thick layer is 250 A or more thick.

31. The process as recited in claim 28 wherein said ultrathin second polymer layer is about 15 to 100 A thick.

32. The process as recited in claim 31 wherein said adsorbed second polymer layer is about 25 to about 75 A thick.

33. The process as recited in claim 28 carried out at ambient temperature.

34. The process as recited in claim 28 wherein said second polymer is present in said solvent at a concentration of about $10^{-5}$ g/ml to about $10^{-1}$ g/ml.

35. The process as recited in claim 34 wherein said second polymer is present in said solvent at a concentration of about $10^{-4}$ g/ml to about $10^{-2}$ g/ml.

36. The process as recited in claim 35 wherein said solvent is a mixture of a solvent and a nonsolvent for said second polymer.

37. The process as recited in claim 36 wherein said thick layer is in the form of a hollow fiber.

38. The process as recited in claim 37 wherein said second polymer solution is contacted with the outside of said hollow fiber.

39. The process as recited in claim 38 wherein said adsorbed second polymer layer is about 15 to 100 A thick.

40. The process as recited in claim 28 wherein said solvent is a mixture of a solvent and a nonsolvent for said second polymer.

41. The process as recited in claim 28 wherein said thick layer is in the form of a hollow fiber.

42. The process as recited in claim 41 wherein said second polymer solution is contacted with the outside of said hollow fiber.

43. The process as recited in claim 28 comprising the additional step of rinsing said gas separation membrane with said solvent.

44. The process as recited in claim 43 wherein said thick layer has a selectivity of at least half that calculated for a defect-free thick layer.

45. The process as recited in claim 28 wherein said thick layer has a selectivity of at least half that calculated for a defect-free thick layer.

46. The process as recited in claim 28 comprising the additional step of drying said gas separation membrane.

* * * * *